US008508768B2

(12) United States Patent
Sekine

(10) Patent No.: US 8,508,768 B2
(45) Date of Patent: Aug. 13, 2013

(54) JOB SCHEDULING IN A WORKFLOW ARCHITECTURE RELATED TO PRINTING

(75) Inventor: Hitoshi Sekine, Los Altos, CA (US)

(73) Assignee: Ricoh Company, Ltd, Tokyo (JP)

( * ) Notice: Subject to any disclaimer, the term of this patent is extended or adjusted under 35 U.S.C. 154(b) by 1018 days.

(21) Appl. No.: 12/118,152

(22) Filed: May 9, 2008

(65) Prior Publication Data
US 2009/0279123 A1  Nov. 12, 2009

(51) Int. Cl.
G06F 3/12 (2006.01)
G06F 7/00 (2006.01)
H04N 1/00 (2006.01)
H04N 1/46 (2006.01)

(52) U.S. Cl.
USPC ........... 358/1.15; 358/1.1; 358/402; 358/403; 358/501; 707/608

(58) Field of Classification Search
USPC ................ 358/1.15, 1.18, 403, 409, 412, 1.1, 358/1.6, 1.12, 1.13, 1.16, 402, 444, 501; 707/607, 600, 706, 705, 740, 821, 608; 713/100, 190, 600
See application file for complete search history.

(56) References Cited

U.S. PATENT DOCUMENTS

| 5,327,526 A * | 7/1994 | Nomura et al. .............. 358/1.16 |
| 6,433,884 B1 * | 8/2002 | Kawakami .................... 358/1.15 |
| 2003/0189724 A1 * | 10/2003 | Kloosterman et al. ....... 358/1.18 |
| 2005/0179921 A1 | 8/2005 | Brossman et al. |
| 2005/0234577 A1 * | 10/2005 | Loughran et al. ............. 700/100 |
| 2006/0114493 A1 | 6/2006 | Slightam et al. |
| 2006/0193006 A1 * | 8/2006 | Lawrence et al. ............ 358/1.16 |
| 2006/0197977 A1 * | 9/2006 | Miyata .......................... 358/1.15 |
| 2007/0031615 A1 * | 2/2007 | Nair et al. ................... 428/32.38 |
| 2007/0177195 A1 * | 8/2007 | Rebert et al. ................. 358/1.15 |

FOREIGN PATENT DOCUMENTS
JP   2000-029647 A   1/2000

* cited by examiner

*Primary Examiner* — Benny Q Tieu
*Assistant Examiner* — Ngon Nguyen
(74) *Attorney, Agent, or Firm* — Duft Bornsen & Fettig, LLP

(57) ABSTRACT

Job schedulers and associated methods of scheduling jobs are disclosed. A job scheduler in one embodiment includes a job queue and a schedule processor. The job queue receives and stores a plurality of jobs to be executed on the devices, such as in a print shop. Each of the jobs defines one or more process to be performed for the job. Each of the processes in a job defines one or more operating parameters for the devices. To schedule the jobs that are stored in the job queue, the schedule processor identifies the processes from the jobs that define one or more common (i.e., the same or equivalent) operating parameters for a device. The schedule processor then schedules the jobs for execution based on the processes that define common operating parameters.

19 Claims, 8 Drawing Sheets

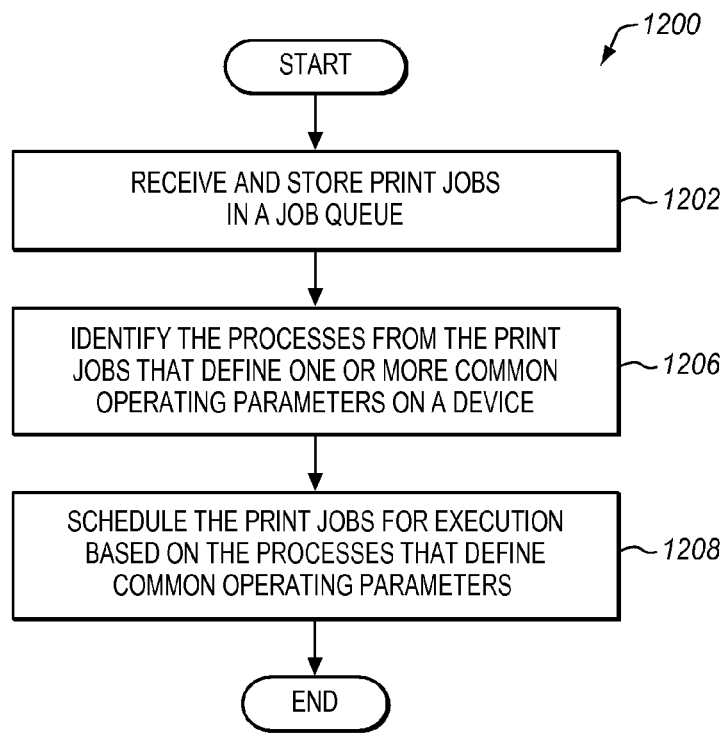
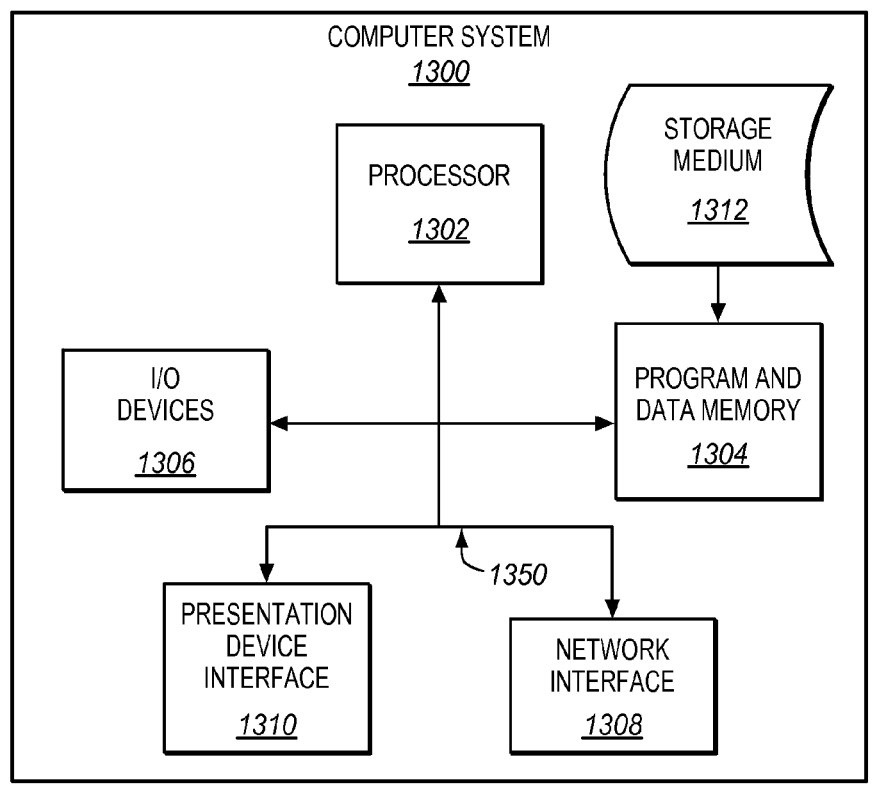

JOB SCHEDULING IN A WORKFLOW ARCHITECTURE RELATED TO PRINTING

BACKGROUND

1. Field of the Invention

The invention relates to the field of printing and, in particular, to scheduling jobs intelligently on devices, such as in a print shop.

2. Discussion of Related Art

A print shop generally refers to a workplace where printing is performed, typically to provide commercial printing services. Customers use print shops to print catalogs, manuals, books, magazines, brochures, etc. Print shops may be large production print shops that implement large inline printers (i.e., continuous feed printers) to print long run-length jobs for a few customers. For example, a large production print shop may print customer bills for a credit card company. Most print shops are smaller shops that print short run-length jobs for many different customers. For example, a small print shop may print magazines, catalogs, books, brochures, etc, for a variety of different customers.

Because most small print shops service many different customers, the small print shops have to be able to change their workflow and system configuration to handle different jobs. A workflow generally refers to some organization of resources, devices, and roles in a print shop for providing printing services. For example, a small print shop may include a black and white printer, a color printer, a cutting device, and a binding device. For a workflow of one customer, the print shop may use the color printer and the cutting device to generate brochures for this customer. For a workflow of another customer, the print shop may use the color printer, the black and white printer, the cutting device, and the binding device to generate books for this customer. Due to the needed flexibility of the small print shops and the cost of new, large inline devices, many of the devices in the print shop are either offline devices or near-line devices as opposed to inline devices. Thus, to switch configurations quickly to handle different types of jobs, the small print shop does not need to re-configure an inline system, but may instead use the offline devices or near-line devices.

The workflow architecture of a print shop is the platform upon which a job is created or generated, and then subsequently executed on the devices in the print shop. The typical workflow architecture as presently practiced comprises software that is run on one or more computers in the print shop. The software is customized for each print shop based on the particular devices used in the print shop and the type of jobs that will be handled in the print shop. For instance, if a print shop has two printers from two different vendors and a cutting device from another vendor, then the customized software for that print shop is programmed based on those specific devices being used.

The customized software allows a print shop operator to create one or more jobs, manage the jobs, schedule the jobs, etc. To provide such functionality, the operating parameters, capabilities, and other information for each of the devices (i.e., the printers, cutting devices, binding devices, etc) in the print shop are defined in the customized software. The customized software may provide a job editor that displays the devices in the print shop and their associated, pre-defined capabilities to the print shop operator. The print shop operator may then create a job by selecting one or more devices in the print shop, and by defining the processes to be executed by each of the devices for the job. For instance, the print shop operator may first select a color printer to print a particular printable file (e.g., a PDF file) to generate printed pages. The print shop operator may then select a folding device to put one or more creases in the printed pages to generate brochures.

When multiple jobs are created through the job editor, the customized software queues the jobs for execution on the devices. The software provides a user interface which displays the queued jobs to the print shop operator. The print shop operator may then schedule the order in which the jobs will be executed by selecting the job to execute first, by selecting the job to execute second, etc. One problem with this present method of scheduling the order of executing jobs is that it is manually performed and based on the subjective decision making of the print shop operator. Simply by viewing the queued jobs, the print shop operator may not be aware of commonalities of the jobs which may make executing the jobs in one order more efficient than executing the jobs in another order. For example, assume that jobs A-C are queued up for execution in that order. If job A and job C are both being printed on the same paper stock with the same finisher actions, and job B is being printed on a different paper stock with a different finisher action, then it may be more efficient to execute job A and job C before job B. A print shop operator may not be aware of the most efficient order for scheduling the jobs.

SUMMARY

Embodiments of the present invention solve the above and other related problems by scheduling jobs based on common operating parameters of the jobs. A job scheduler in one embodiment includes a job queue and a schedule processor. The job queue receives and stores a plurality of jobs to be executed on the device, such as in a print shop. Each of the jobs defines one or more processes to be performed for the job. Each of the processes in a job defines one or more operating parameters for the devices that will be performing the processes. For example, if the device comprises a printer, then the operating parameters of a process may define the type of media used in the printing process, such as 8½×11 size, 90 brightness, 20 pound stock. For another example, the operating parameters may be the finisher configuration of the printer, such as to staple the output on the upper right corner.

To schedule the jobs that are stored in the job queue, the schedule processor identifies the processes from the jobs that define one or more common (i.e., the same or equivalent) operating parameters on a device. The schedule processor then schedules the jobs for execution based on the processes that define common operating parameters. For example, the schedule processor may identify the processes from the jobs that define a common media (e.g., a paper stock of a particular size, brightness, and weight) on the device, and schedule the jobs for execution based on the processes that define the common media on the device. As another example, the schedule processor may identify the processes from the jobs that define a common configuration (e.g., a common finisher configuration on a printer) on the device, and schedule the jobs for execution based on the processes that define the common configuration on the device. The schedule processor may schedule the jobs for execution so that the jobs having the processes that define common operating parameters are executed sequentially on the device.

By looking at the operating parameters of the processes in the jobs, the schedule processor can advantageously schedule the jobs in an intelligent manner. Instead of relying on the print shop operator or another user to manually and subjectively determine the schedule for the executing the jobs, the schedule processor can determine the optimal order for executing the jobs based on the operating parameters for the processes. Thus, a print shop can operate more efficiently.

The invention may include other exemplary embodiments described below.

BRIEF DESCRIPTION OF THE DRAWINGS

The same reference number represents the same element or same type of element on all drawings.

FIG. 12 is a flow chart illustrating a method of scheduling jobs in an exemplary embodiment of the invention.

FIG. 13 illustrates a computer system operable to execute computer readable medium embodying programmed instructions to perform desired functions in an exemplary embodiment of the invention.

DETAILED DESCRIPTION OF THE DRAWINGS

FIGS. 1-13 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Embodiments provided herein describe systems and methods for scheduling jobs, such as in a print shop. The systems and methods may be implemented in a specific workflow architecture. Thus, the workflow architecture is described below and in FIGS. 1-10. The systems and methods for scheduling jobs in this architecture, and possibly other architectures, are then described in FIGS. 11-12.

Workflow Architecture

Figure 1:
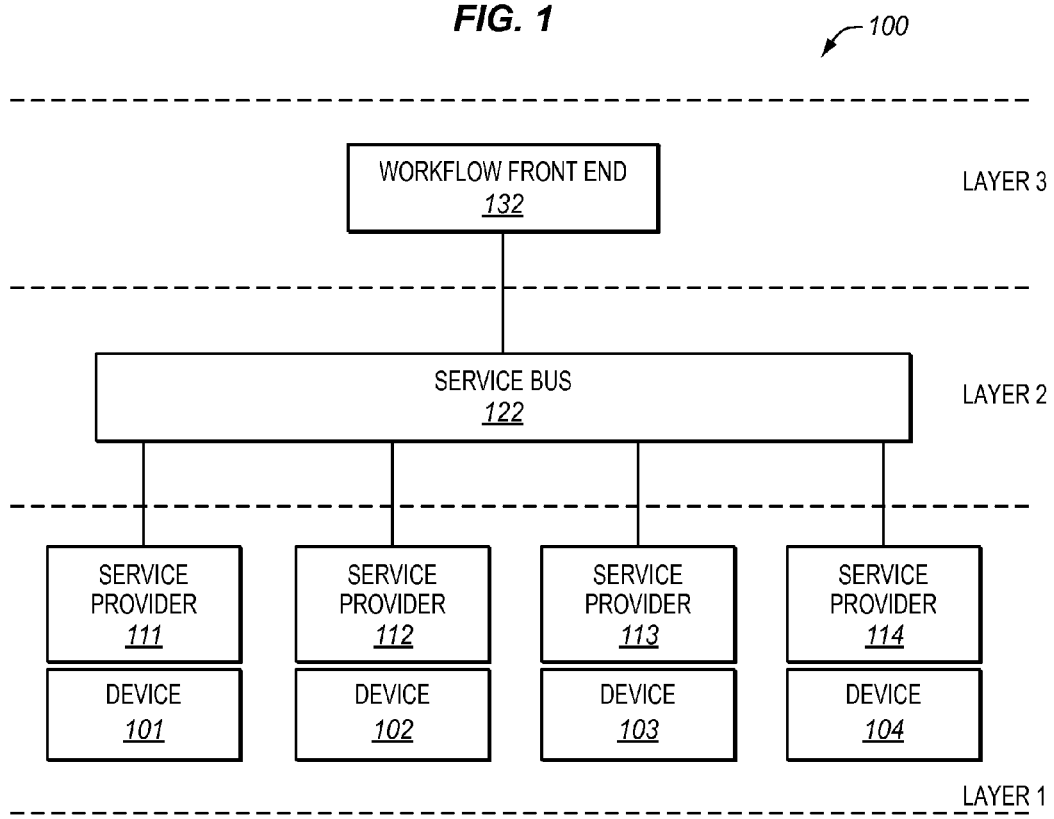
FIG. 1 illustrates a workflow architecture in an exemplary embodiment of the invention.

FIG. 1 illustrates a workflow architecture 100 in an exemplary embodiment of the invention. Workflow architecture 100 may be implemented in a print shop. Workflow architecture 100 includes or is implemented with a plurality of devices 101-104 that are each operable to perform processes. For example, devices 101-104 may perform printing processes, cutting processes, binding processes, or other types of print shop processes. Although the term "device" commonly refers to a mechanical device operable to perform a process, the term "device" as used herein may also refer to humans that are able to perform processes. Devices 101-104 may be inline devices, near-line devices, or offline devices.

Workflow architecture 100 is implemented as a multi-layer platform in this embodiment. The first layer (Layer 1) is the device-level layer. Layer 1 is comprised of one or more service providers 111-114. Service providers 111-114 are each associated with a device 101-104. A service provider comprises any system, software, or module that is operable to monitor, store, and/or report capabilities of the devices 101-104. Device capabilities comprise any data or information that describes or indicates the activities, actions, or services offered by a device. The device capabilities may define the input resources for an activity offered by a device, the output resources for an activity offered by a device, and/or any operating parameters or device configuration used to perform an activity, action, or a service. Service providers 111-114 are able to determine, in real-time, the present capabilities of its associated device. For instance, service providers 111-114 may be operable to repeatedly monitor its associated device, such as by transmitting queries to the device or receiving updates from the device. By repeatedly monitoring the device capabilities of the device, a service provider 111-114 may thus determine the real-time device capabilities of the device. These real-time device capabilities may then be reported so that the architecture 100 always has the present or run-time device capabilities for all of the devices.

A service provider may also be operable to execute one or more processes using its associated device. For example, if a service provider is associated with a printer, then the service provider may be operable to execute a printing process on the printer.

The second layer (Layer 2) of the architecture 100 is a service bus 122. A service bus comprises any system, software, or module that is operable to store or integrate device capabilities for a print shop, and execute (manage) jobs, such as a print job. A print job comprises any task that defines one or more processes to be performed in a print shop. For example, a print job may define a printing process, a cutting process, a binding process, etc.

The third layer (Layer 3) of the architecture 100 is a workflow front end 132. A workflow front end comprises any system, software, or module that is operable to provide a user interface that allows a user to create a job ticket. The workflow front end is further operable to provide a user interface that allows the user to view the status of jobs being executed in service bus 122, and/or to manage the jobs in service bus 122. Although one workflow front end 132 is illustrated in FIG. 1, multiple workflow front ends may be implemented in other embodiments.

Figure 2:
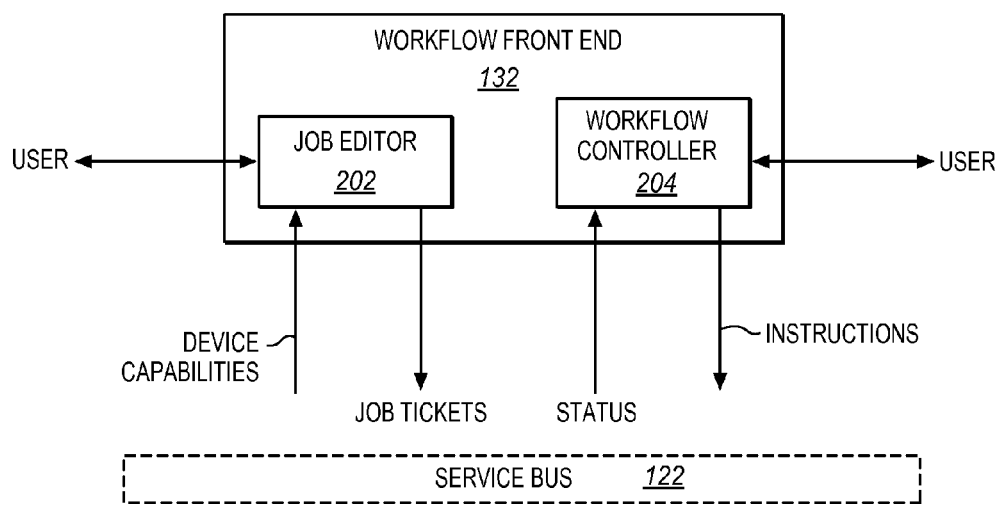
FIG. 2 illustrates a workflow front end in an exemplary embodiment of the invention.

FIG. 2 illustrates a workflow front end 132 in an exemplary embodiment of the invention. In this embodiment, workflow front end 132 includes a job editor 202 and a workflow controller 204. Job editor 202 allows the user to create job tickets for print jobs or other types of jobs. Job editor 202 receives device capabilities of the devices 101-104 in the print shop from service bus 122 (as originally reported by each of service providers 111-114). Job editor 202 provides a user interface that displays the devices and their capabilities to the user. The user interface may comprise a graphical user interface (GUI) or another type of user interaction mechanism that allows the user to view information and enter instructions. For example, job editor 202 may provide a user interface that lists the devices 101-104 and the capabilities of the devices 101-104 to the user. Through the user interface, the user may define a job ticket for a job by selecting particular devices 101-104 and particular processes (or activities) to be performed by the devices 101-104. As an example, the user may select device 101 to print documents, and select device 102 to put a crease in the documents. Based on the input from the user in selecting devices and processes, job editor 202 generates a job ticket and transmits the job ticket to the service bus 122 for execution. Job editor 202 may also allow the user to set or change the configuration of devices 101-104.

One type of job ticket that may be used is a Job Definition Format (JDF) job ticket. A JDF job ticket is in XML format, and describes a job ticket, a message description, and message interchange. A JDF job ticket includes information that enables a device to determine what files are needed as input (if any), where the files are located, and what processes the device should perform. Other messages may be communicated in the workflow architecture 100 as Job Messaging Format (JMF) messages. JMF is part of the JDF specification. A JMF message is in XML format, and allows for communication of events (start, stop, error), status (available, offline, stalled, etc.), results (count, waste, etc.), and other details.

Workflow controller 204 provides user interface functions for service bus 122. When a user creates job tickets through job editor 202, the job tickets are transmitted to service bus 122 for execution. Service bus 122 schedules the job tickets for execution, and executes the job tickets as scheduled. Workflow controller 204 provides a user interface that displays the schedule of job tickets to the user, and also allows the user to change the schedule of job tickets. When a job ticket is executed in service bus 122, workflow controller 204 provides a user interface that displays the status. The user may also manage the job tickets that are being queued or executed in service bus 122.

Figure 3:
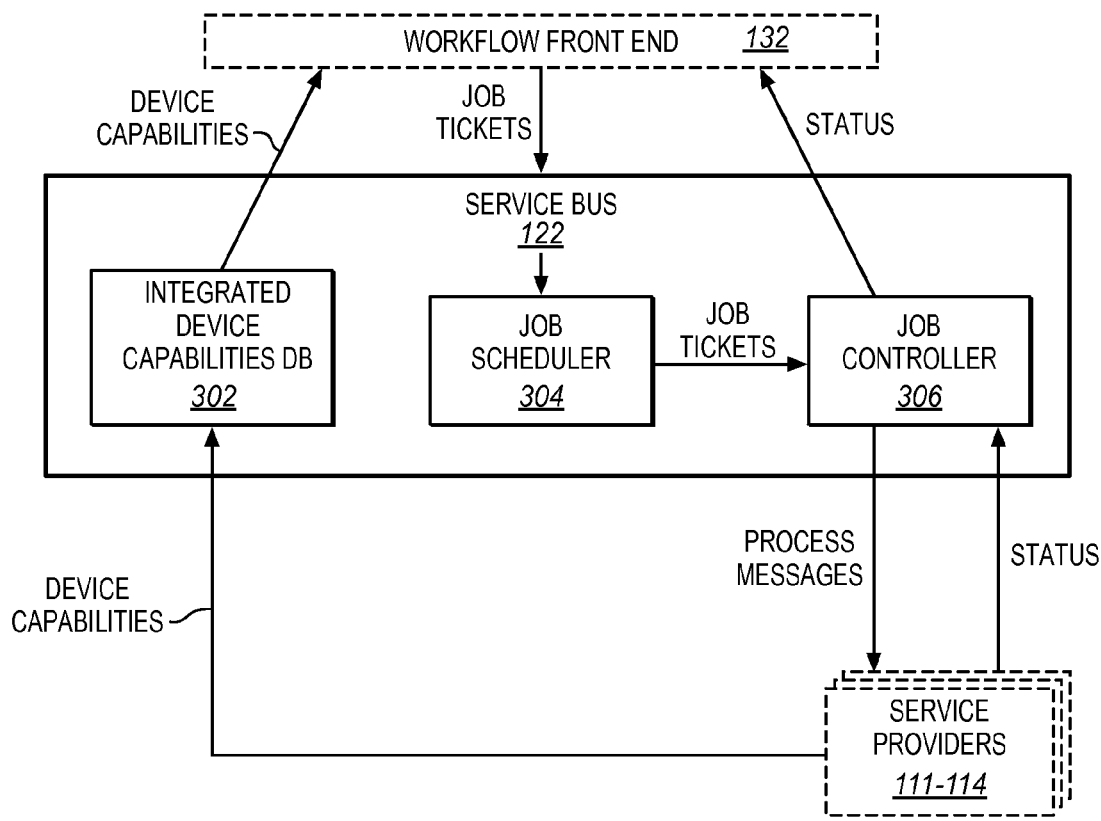
FIG. 3 illustrates a service bus in an exemplary embodiment of the invention.

FIG. 3 illustrates a service bus 122 in an exemplary embodiment of the invention. In this embodiment, service bus 122 includes an integrated device capability database 302, a job scheduler 304, and a job controller 306. Integrated device capability database 302 comprises any system, software, or module operable to receive a report or indication of device capabilities from service providers 111-114, and store the device capabilities. Integrated device capability database 302 may store the device capabilities in a device capability file that represents the entirety of the processes available. For instance, the device capabilities files may represent the entirety of the processes available (at run-time) in a print shop.

Integrated device capability database 302 may be further operable to register or unregister service providers 111-114 as needed or desired. For example, if a device 101-104 (see also FIG. 1) is taken out of service temporarily or permanently, then integrated device capability database 302 may unregister the service provider 111-114 for that device 101-104 while the device is out of service.

Job scheduler 304 comprises any system, software, or module operable to receive and store job tickets from workflow front end 132, and schedule the stored job tickets for execution. For example, the received job tickets may be JDF job tickets. Job scheduler 304 may schedule the job tickets according to an algorithm (e.g., first in first out), according to instructions from the operator, or according to some other method.

Job controller 306 comprises any system, software, or module operable to execute a job ticket (or a job defined by the job ticket). When job controller 306 receives a job ticket for execution as scheduled by job scheduler 304, job controller 306 is operable to identify the processes defined in the job ticket, and to identify the service providers 111-114 to perform the processes defined in the job ticket. Job controller 306 is also operable to generate process messages that request the identified processes be executed. A process message comprises any type of message that requests or instructs a device to perform or execute one or more processes. In one example, the process message is a JDF job ticket. Job controller 306 is further operable to transmit the process messages to the identified service providers 111-114 so that the processes requested in the process messages may be executed.

Job controller 306 is also operable to receive the status of processes of a job ticket. Job controller 306 may modify a job ticket based on the status of one or more of the processes, such as by substituting one device 101-104 (see also FIG. 1) with another device (e.g., one of the devices 101-104 is unavailable to perform a process). Job controller 306 may also provide the status of the processes to workflow controller 204 (see FIG. 2) for display to a user.

Figure 4:
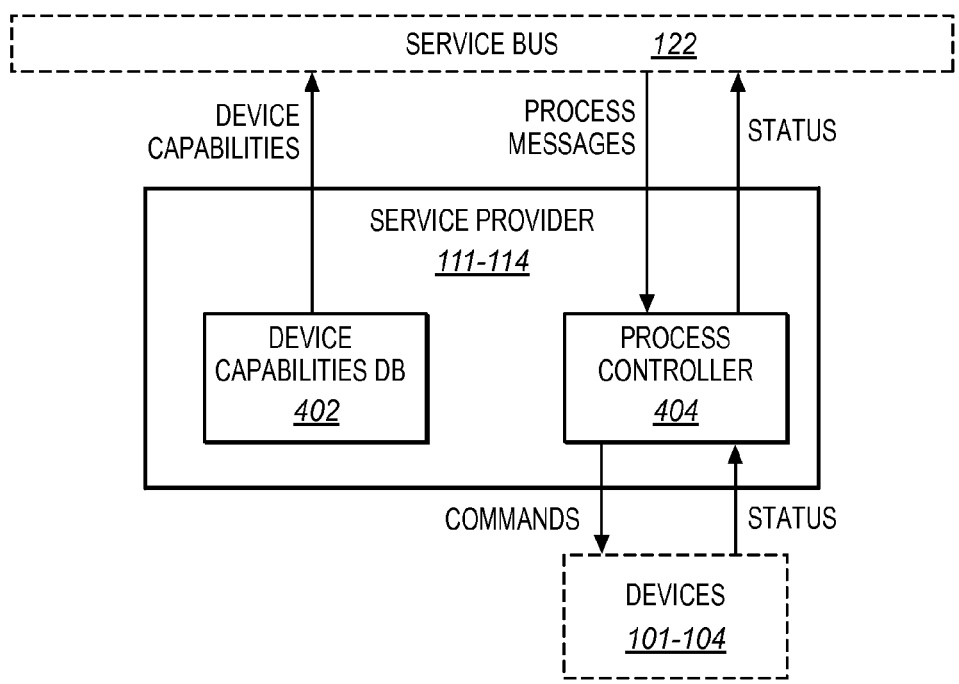
FIG. 4 illustrates a service provider in an exemplary embodiment of the invention.

FIG. 4 illustrates a service provider 111-114 in an exemplary embodiment of the invention. In this embodiment, service provider 111-114 includes a device capability database 402 and a process controller 404. Device capability database 402 comprises any system, software, or module operable to monitor the capabilities of a device 101-104 to determine its device capabilities, to store the device capabilities for a device 101-104 with which it is associated, and to report the device capabilities for a device 101-104 to service bus 122.

The device capabilities for a device 101-104 may be defined in a service provider 111-114 in a variety of ways. For example, the device manufacturer may define the device capabilities for a device according to a format set forth for workflow architecture 100. In another example, the manufacturer or provider of the workflow architecture may define service providers or device capabilities for multiple devices that may be part of a print shop. The appropriate service providers may then be activated if a new device is added to the print shop. In another example, an operator may dynamically define the device capabilities of a device, such as through workflow front end 132.

Process controller 404 comprises any system, software, or module operable to execute one or more processes on a device 101-104. When process controller 404 receives a process message from service bus 122, process controller 404 is operable to identify the process or processes to be executed in the process message, and execute the process or processes using its associated device 101-104. For example, if the process message comprises a JDF job ticket, then process controller 404 processes the JDF job ticket to identify what files are needed as input (if any), where the files are located, and what processes the device should perform. Process controller 404 may then convert the JDF job ticket into device-specific operational commands in the format compatible with its associated device 101-104, and transmit the device-specific operational commands to its associated device 101-104 to execute the process identified in the JDF job ticket.

Process controller 404 is also operable to monitor the status of a process or processes being performed on its associated device 101-104. Process controller 404 is also operable to report the status of the process(es) to service bus 122. Process controller 404 may use a JMF message to report the status of the processes to service bus 122.

This multi-layer workflow architecture 100 (see FIG. 1) advantageously provides a flexible platform for a print shop or for other applications. Because service providers 111-114 are able to report the device capabilities of devices 101-104 to service bus 122, that may, in turn provide them to workflow front end 132, the present or real-time capabilities of all of the devices 101-104 are available to the user when creating a job ticket. Thus, if a new device is added to the print shop for example, then the service provider associated with the new device will report the device capabilities of the new device to service bus 122, and the capabilities of the new device will be available to the operator when creating a job ticket. Similarly, if an existing device 101-104 is changed, then the service provider 111-114 associated with the changed device 101-104 will report the new device capabilities to service bus 122, and the capabilities of the changed device 101-104 will be available to the user when creating a job ticket. Because a service provider of a newly-added device or a changed device can automatically report device capabilities to the service bus, devices can be efficiently added or changed, such as in a print shop.

Method of Handling a Job Ticket

Figure 5:
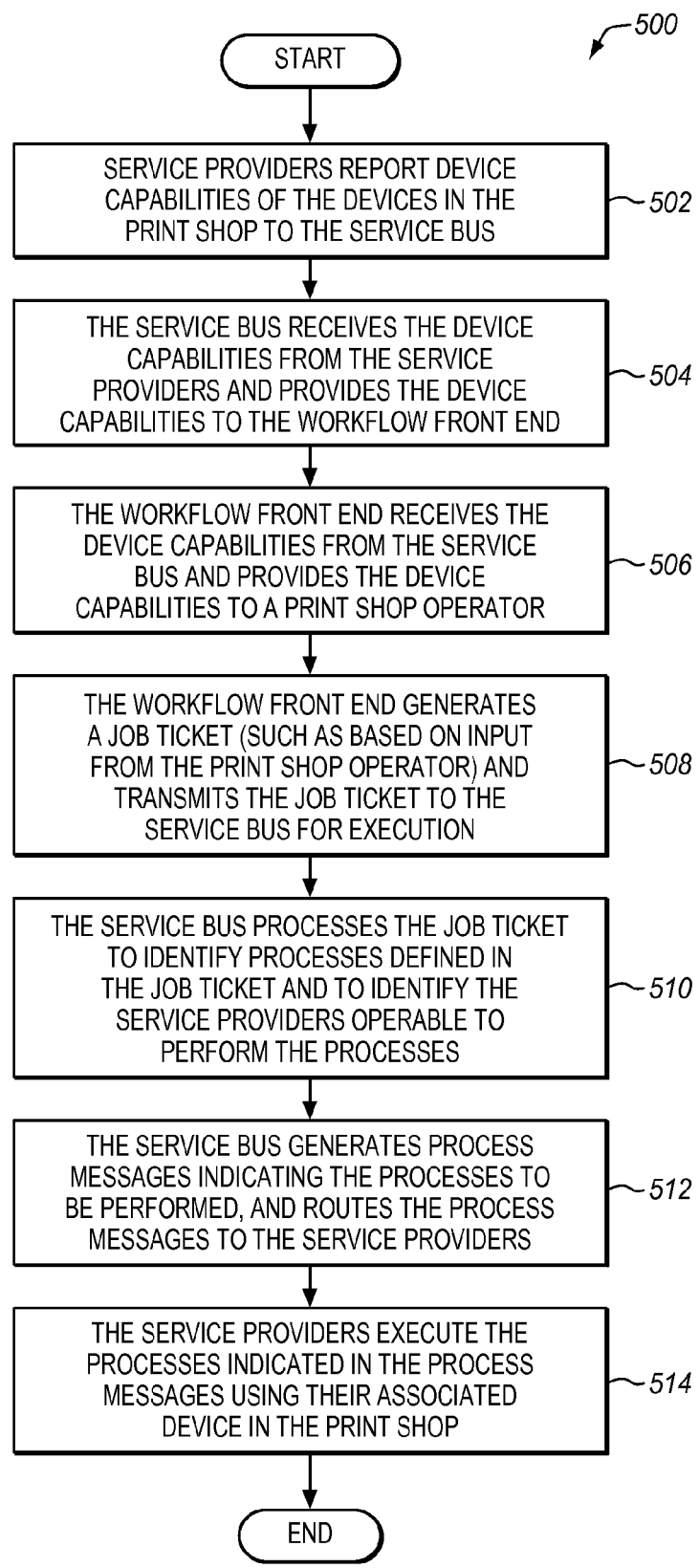
FIG. 5 is a flow chart illustrating a method of creating and executing a job in an exemplary embodiment of the invention.

To illustrate how workflow architecture 100 operates in the print shop, FIG. 5 is a flow chart illustrating a method 500 of creating and executing a job ticket in an exemplary embodiment of the invention. The steps of method 500 will be described with reference to workflow architecture 100 in FIG. 1, although method 500 may be performed through other architectures and other devices in other embodiments. The steps of the flow chart in FIG. 5 are not all inclusive and may include other steps not shown.

As previously stated, service providers 111-114 store device capabilities for their associated devices 101-104, such as in device capabilities database 402 (see also FIG. 4). Service providers 111-114 each report the device capabilities of the devices 101-104 to service bus 122 in step 502. Service providers 111-114 may report the device capabilities according to one or more triggers. For instance, service providers 111-114 may report the device capabilities when their associated devices 101-104 are put into operation, or when a change is made to the device 101-104 or its operating parameters. Service providers 111-114 may alternatively report the device capabilities periodically, such as every minute, every hour, etc. Service providers 111-114 may alternatively report the device capabilities responsive to a request by service bus 122.

In step 504, service bus 122 receives the device capabilities from service providers 111-114. Integrated device capabilities database 302 (see also FIG. 3) may then integrate the device capabilities from each of the service providers 111-114 into an integrated device capability file for the print shop. The integrated device capability file represents the entirety of the processes available in the print shop. Integrated device capabilities database 302 monitors the device capabilities for devices 101-104. For example, integrated device capabilities database 302 may periodically query the service providers 111-114 to make sure the device capabilities are up to date. Service bus 122 also provides the device capabilities for the devices 101-104 in the print shop to workflow front end 132 in step 504.

In step 506, workflow front end 132 receives the device capabilities from service bus 122, such as in job editor 202 (see also FIG. 2). Job editor 202 then provides a user interface that displays or otherwise provides the device capabilities of the devices 101-104 to a print shop operator. This allows the print shop operator (or another user) to define a job ticket based on the device capabilities. Because the device capabilities indicate the devices 101-104 that are available and the activities, actions, or service offered by devices 101-104, the print shop operator (or other user) may select one or more of the devices 101-104 and one or more of the processes to be performed by the devices 101-104 as a subset of the device capabilities. Responsive to the input from the print shop operator, job editor 202 generates a job ticket for a print job in step 508. Because the job ticket is created based on the device capabilities of devices 101-104 in the print shop, the job ticket is virtually guaranteed to be executable on service bus 122. Workflow front end 132 then transmits the job ticket to service bus 122 also in step 508.

In one alternative, workflow front end 132 may generate a web page that indicates the device capabilities of devices 101-104 in the print shop. The web page generated by workflow front end 132 may be part of an online store provided by the print shop. A customer may then view the web page, and select one or more of the devices 101-104 and one or more of the processes to be performed by the devices 101-104 as a subset of the device capabilities. A job ticket may then be generated at the customer end, or may be generated in job editor 202 based on the selections by the customer. If the job ticket is generated at the customer end, then workflow front end 132 receives the generated job ticket from the customer over a network, such as the internet. The job ticket generated by a customer may be in a proprietary format. Thus, if workflow front end 132 receives a job ticket from the customer in a proprietary format, the workflow front end 132 converts the job ticket in the proprietary format to a JDF job ticket. Workflow front end 132 may then transmit the JDF job ticket to service bus 122.

Service bus 122 receives the job ticket, such as in job scheduler 304 (see also FIG. 3). Job scheduler 304 schedules the job ticket according to an algorithm or input from a print shop operator. At some point, job scheduler 304 outputs the job ticket to job controller 306 for execution. Job controller 306 processes the job ticket to identify the processes defined in the job ticket, and to identify the service providers 111-114 operable to perform the processes in step 510. For instance, if the job ticket is in JDF format, then job controller 306 processes the JDF job ticket to identify the processes defined for the job. In step 512, job controller 306 generates process messages indicating the processes to be performed. Job controller 306 may, for each individual process, generate JDF job tickets indicating what files are needed as input (if any), where the files are located, and what process (or processes) the service provider 111-114 should perform. Job controller 306 then routes the process messages to service providers 111-114 in step 512.

One or more of the service providers 111-114 receive a process message from service bus 122. Through process controller 404 (see also FIG. 4), the service providers 111-114 that receive a process message execute the process (or processes) indicated in the process message using its associated device 101-104 in step 514. For example, if the process message is a JDF job ticket, then the service providers 111-114 may convert the JDF job ticket into device-specific operational commands in the format compatible with its associated device 101-104. Service providers 111-114 then transmit the device-specific operational commands to its associated device 101-104 to execute the process identified in the JDF job ticket.

Service providers 111-114 are each able to identify the status of the process executed using its associated device 101-104. Service providers 111-114 then transmit the status of the process to service bus 122. Service bus 122 transmits the status of the processes of the job to workflow front end 132. The status of the process may be transmitted in workflow architecture 100 in a JMF message. Workflow front end 132, such as through workflow controller 204, then indicates the status of the processes to the print shop operator. The print shop operator may then monitor the status of the entire job.

The print shop operator may manage or modify the job ticket that is being executed in service bus 122. For instance, if one of the devices 101-104 encounters an error or becomes unavailable, then the print shop operator may modify the job ticket to define a new device 101-104 or a new process. Similarly, service bus 122 may automatically modify the job ticket based on the status of the processes. If one of the devices 101-104 encounters an error or becomes unavailable, then service bus 122 is able to modify the job ticket to replace this device with another device in the print shop to perform the process.

Example #1

Figure 6:
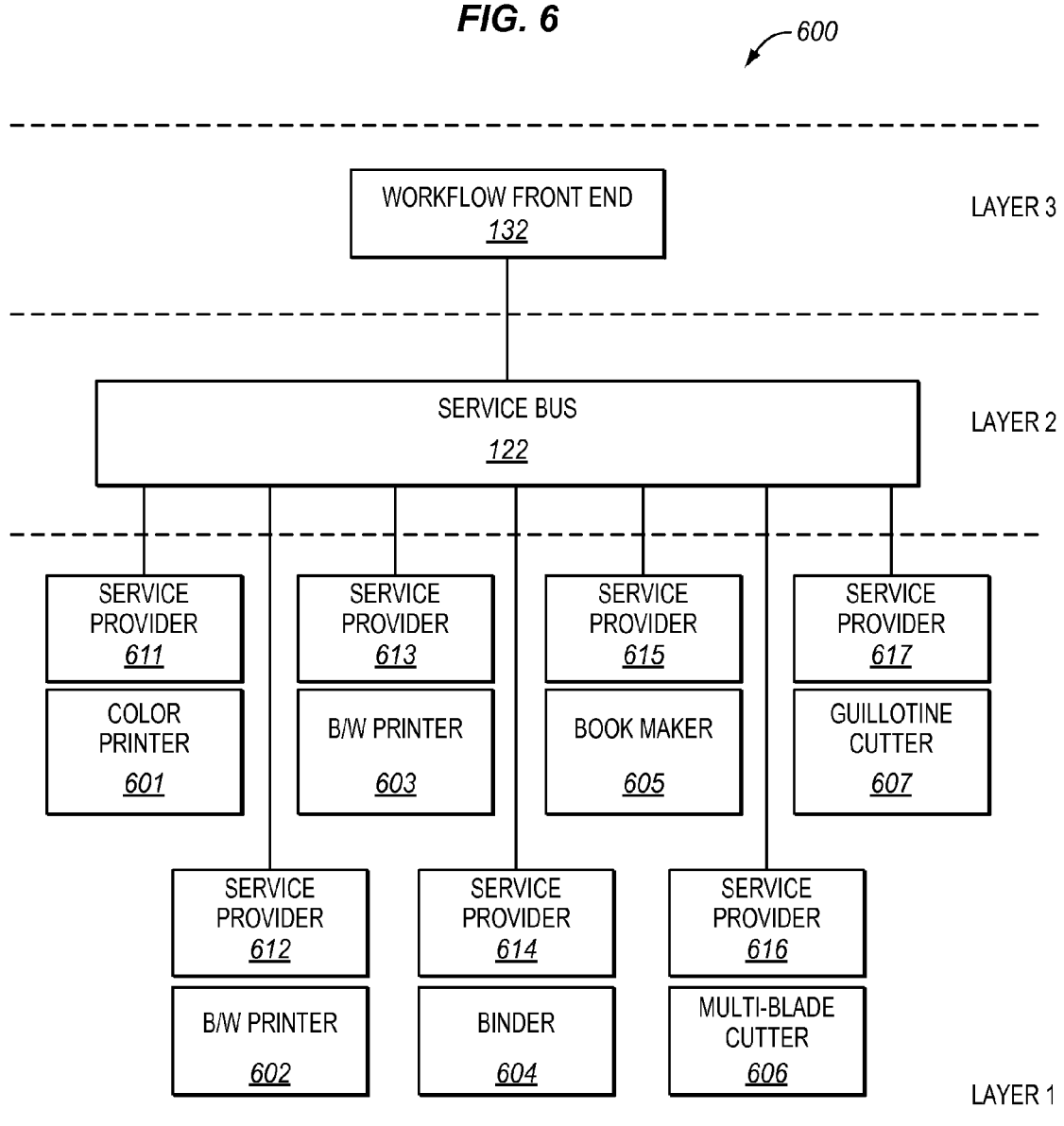
FIG. 6 illustrates another workflow architecture for a print shop in an exemplary embodiment of the invention.

FIGS. 6-9 illustrate an example of handling a particular job ticket in a print shop. The print shop in this example may use a workflow architecture similar to that shown in FIG. 1. FIG. 6 illustrates a workflow architecture 600 for the print shop in an exemplary embodiment of the invention. The print shop in this embodiment includes a color printer 601, a black and white printer 602 from a first vendor, and a black and white printer 603 from a second vendor. The print shop also includes a binder 604 and a book maker 605. The binder 604 and the book maker 605 are offline devices. The print shop also includes a multiple blade cutter 606 and a guillotine cutter 607. Both cutters 606-607 are near-line devices. Those skilled in the art will appreciate that a print shop may include more or less devices as desired.

Figure 10:
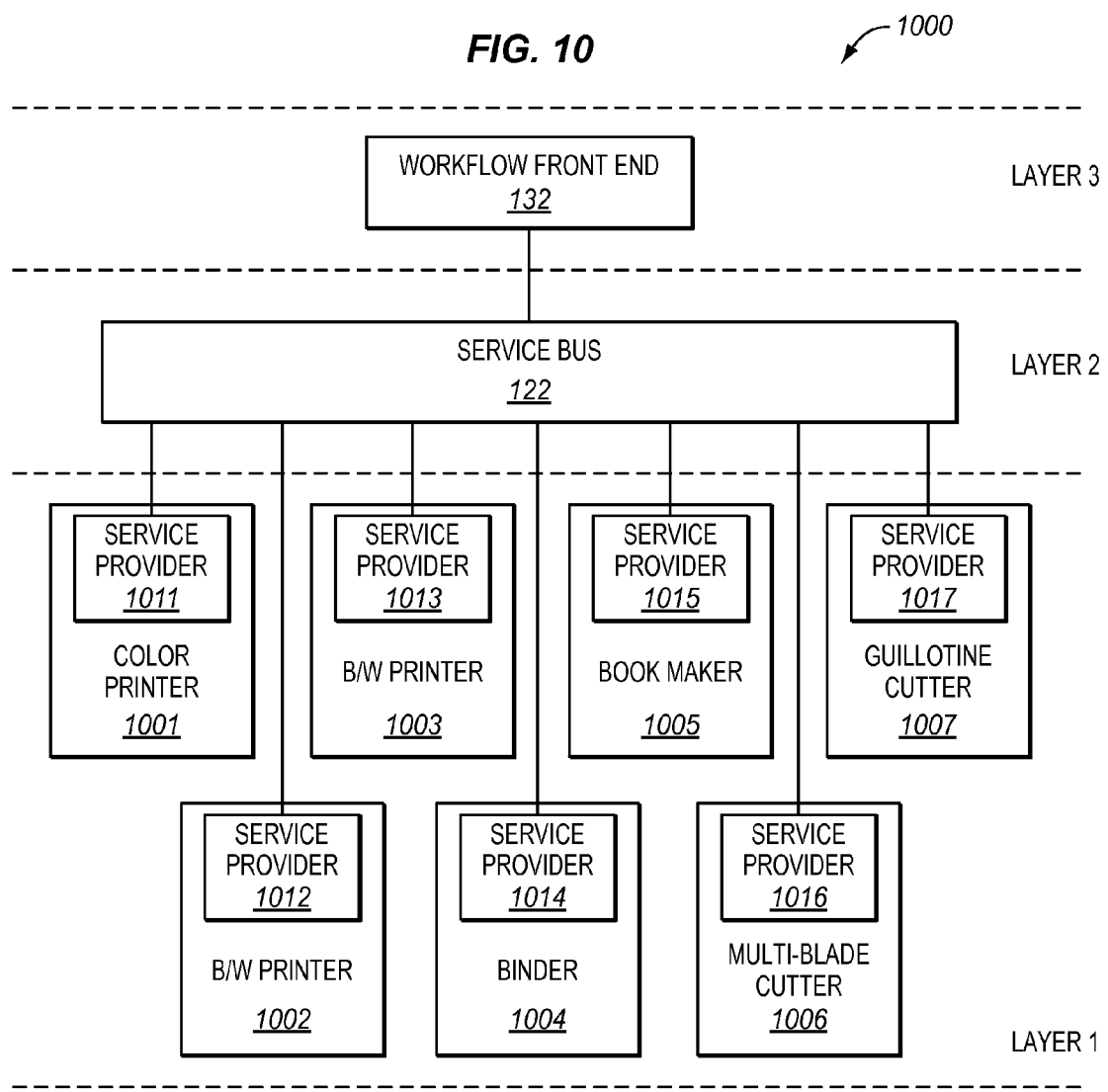
FIG. 10 illustrates a workflow architecture with service providers implemented within devices in an exemplary embodiment of the invention.

As with workflow architecture 100 shown in FIG. 1, workflow architecture 600 is implemented as a multi-layer platform having a plurality of service providers 611-617, a service bus 122, and a workflow front end 132. Service providers 611-617 are each associated with a device 601-607 in the print shop. Service provider 611 is associated with color printer 601 and stores the device capabilities for color printer 601. Service provider 612 is associated with black and white printer 602 and stores the device capabilities for black and white printer 602. Service provider 613 is associated with black and white printer 603 and stores the device capabilities for black and white printer 603. Service provider 614 is associated with the binder 604 and stores the device capabilities for binder 604. Service provider 615 is associated with the book maker 605 and stores the device capabilities for book maker 605. Service provider 616 is associated with the multiple blade cutter 606 and stores the device capabilities for cutter 606. Service provider 617 is associated with the guillotine cutter 607 and stores the device capabilities for cutter 607. Although the service providers in FIG. 6 are illustrated as external to its associated device, the service providers may be integrated within the devices. FIG. 10 illustrates workflow architecture 600 with the service providers 611-617 implemented within the devices 601-607.

At some point during operation, each service provider 611-617 reports the device capabilities for its associated device 601-607 to service bus 122 so that service bus 122 has real-time information on the device capabilities of each of devices in the print shop. The device capabilities may be provided in a declarative language, such as XML. For example, the following illustrates an example of the device capabilities of printer 602 for finishing as provided by service provider 612:

```
<DeviceCapabilities Name="FinishingParams">
    <EnumerationState Name="Collate" AllowedValueList="None Sheet" DefaultValue="None"/>
    <EnumerationState Name="Sides" AllowedValueList="OneSidedFront TwoSidedFlipX TwoSidedFlipY" DefaultValue="OneSidedFront"/>
    <XYPairState Name="Resolution" AllowedValueList="600 600 1200 1200" DefaultValue="600 600"/>
    <BooleanState Name="Staple" AllowedValueList="true false" DefaultValue="false"/>
    <EnumerationState Name="StaplePosition" AllowedValueList="TopLeft Left2 BottomLeft Bottom2 BottomRight Right2 TopRight Top2 Center2" DefaultValue="TopLeft"/>
    <EnumerationState Name="StapleAngle" AllowedValueList="Vertical Horizontal Slant" DefaultValue="Vertical"/>
    <BooleanState Name="Punch" AllowedValueList="true false" DefaultValue="false"/>
    <EnumerationState Name="PunchPosition" AllowedValueList="Top Left Bottom Right" DefaultValue="Left"/>
    <EnumerationState Name="PunchNumHoles" AllowedValueList="2 3 4" DefaultValue="2"/>
</DeviceCapabilities>
```

The following illustrates an example of the device capabilities of printer 602 for handling or providing different types of media (i.e., paper) as provided by service provider 612:

```
<DeviceCapabilities Name="Media">
    <XYPairState Name="Dimension" AllowedValueList="595 842 612 792 792 1224" DefaultValue="612 792"/>
    <EnumerationState Name="MediaType" AllowedValueList="Plain Recycled Special Letterhead Bond Cardstock" DefaultValue="Plain"/>
    <NumberState Name="Weight" AllowedValueList="60~250" DefaultValue="60"/>
    <EnumerationState Name="Location" AllowedValueList="AutoSelect Tray1 Tray2 Tray3 BypassTray" DefaultValue="AutoSelect"/>
</DeviceCapabilities>
```

Service bus 122 receives the device capabilities from the service providers 611-617, and integrates the device capabilities into an integrated device capabilities database. The device capability database represents the entirety of the processes and devices available in the print shop. Service bus 122 then provides an integrated device capabilities file to workflow front end 132, such as responsive to a request from workflow front end 132.

Workflow front end 132, responsive to receiving the integrated workflow capabilities file, provides a user interface that displays or otherwise indicates actions or services that may be performed using devices 601-607 based on the device capabilities indicated in the integrated device capabilities file. Because the device capabilities indicate the devices 601-607 that are available and the processes that are available, the print shop operator may select one or more of the devices 601-607 and one or more of the processes performed by the devices 601-607 as a subset of the device capabilities. Assume for this embodiment that the print shop operator wants to create a bound instruction book.

To create the instruction book, the print shop operator may first select one of the printers 601-603 to print the instruction book, and may also indicate the printable file to be printed on the selected printer, such as a PDF file. Because the interior pages for the instruction book are in black and white, assume for this example that the print shop operator selects black and white printer 602 through the user interface to print the pages of the instruction book. The instruction book is also to be bound in some manner, so the print shop operator may next select binder 604 or bookmaker 605 through the user interface to bind the pages of the instruction book. Assume for this example that the print shop operator selects binder 604 through the user interface to bind the printed pages of the instruction book. The desired size of the instruction book may be smaller than the paper stock available in black and white printer 602, so the print shop operator may next select one of the cutters 606-607 to cut or trim the printed pages down to the correct size. Assume for this example that the print shop operator selects guillotine cutter 607 through the user interface to cut the bound, printed pages.

In addition to selecting the black and white printer 602, binder 604, and cutter 607 to perform particular processes, the print shop operator may view the operating parameters for these devices, and set or change the operating parameters as desired. For example, the print shop operator may select a particular type of paper stock from black and white printer 602. The print shop operator may set the cutting parameters for cutter 607. The adjustable parameters for each of the devices will be displayed by workflow front end 132 through the user interface.

Responsive to the input from the print shop operator, workflow front end 132 generates a job ticket for a job. Because the job ticket is created based on the device capabilities of black and white printer 602, binder 604, and cutter 607, the job ticket is virtually guaranteed to be executable on service bus 122. In this example, the job ticket comprises a JDF job ticket. The JDF job ticket that describes the processes that are to be performed by black and white printer 602, binder 604, and cutter 607. The JDF job ticket also includes a location of the PDF file for the instruction book. Workflow front end 132 then transmits the JDF job ticket to service bus 122.

Service bus 122 receives the JDF job ticket, and processes the JDF job ticket to identify the processes defined for the job. Service bus 122 also identifies the service providers 611-617 operable to perform the processes, which are service providers 612, 614, and 617. Service bus 122 then generates another JDF job ticket or re-uses the JDF job ticket for each of the service providers 612, 614, and 617. The JDF job tickets each indicate what files are needed as input (if any), where the files are located, and what process (or processes) should be performed. Service bus 122 then routes a JDF job ticket to service provider 612 (which is associated with black and white printer 602).

Service provider 612 receives the JDF job ticket from service bus 122. The JDF job ticket is written in XML format. For example, the following illustrates an example of an excerpt of the JDF job ticket transmitted to service provider 612 which indicates the type of finishing to perform:

```
<JobTicket>
  <DigitalPrintingParams Collate="Sheet"/>
  <LayoutPreparationParams Sides="TwoSidedFlipX"/>
</JobTicket>
```

Figure 7:
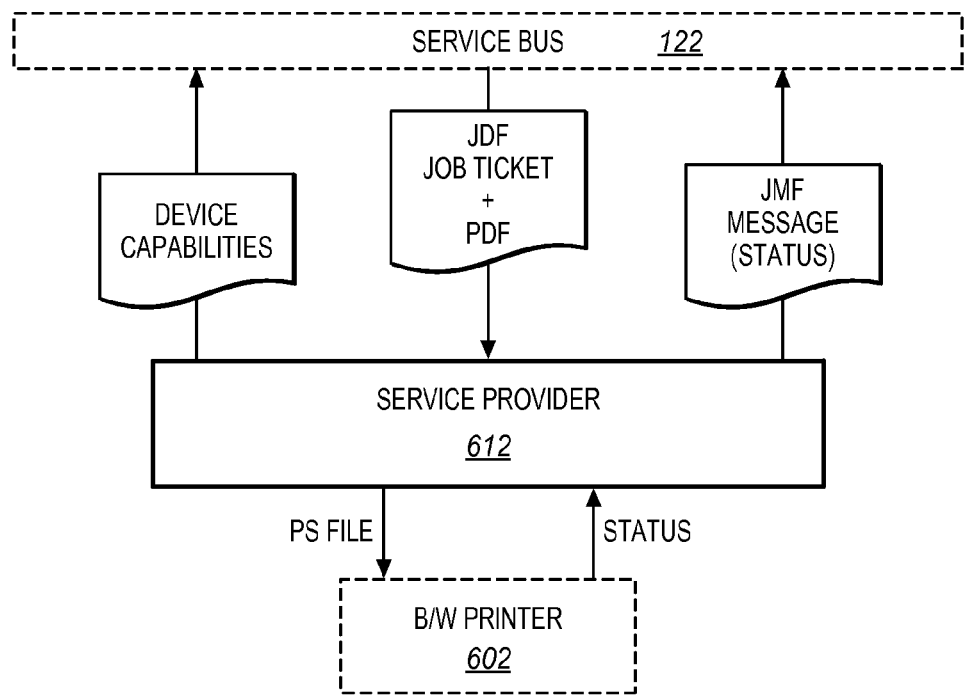
FIG. 7 illustrates messages exchanged between a service provider for a printer and a service bus in an exemplary embodiment of the invention.

FIG. 7 illustrates the messages exchanged between service provider 612 and service bus 122 in an exemplary embodiment of the invention. Service provider 612 receives the JDF job ticket and the PDF file from service bus 122. The JDF job ticket requests that service provider 612 execute a printing process on black and white printer 602 to print the PDF file. Thus, service provider 612 converts the JDF job ticket into device-specific operational commands in the format compatible with black and white printer 602. For example, service provider 612 may convert the PDF file and the JDF job ticket into a PostScript (PS) file. Service provider 612 then transmits the PostScript file to black and white printer 602, and black and white printer 602 prints the PostScript file.

Service provider 612 also monitors the status of the printing process on black and white printer 602. To report the status to service bus 122, service provider 612 transmits a JMF message back to service bus 122 indicating the status so that service bus 122 may monitor the overall status of the print job. For example, service provider 612 may transmit a JMF message indicating when the printing process has ended.

After the printing process has been completed, the output from black and white printer 602 comprises printed pages for the instruction book. The next step in the workflow is to bind the printed pages. Because binder 604 is an offline device, the output from black and white printer 602 is not automatically sent to binder 604 as input. Thus, service bus 122 instructs the print shop operator to manually insert the printed pages in binder 604. Service bus 122 also routes a JDF job ticket to service provider 614 (which is associated with binder 604).

Figure 8:
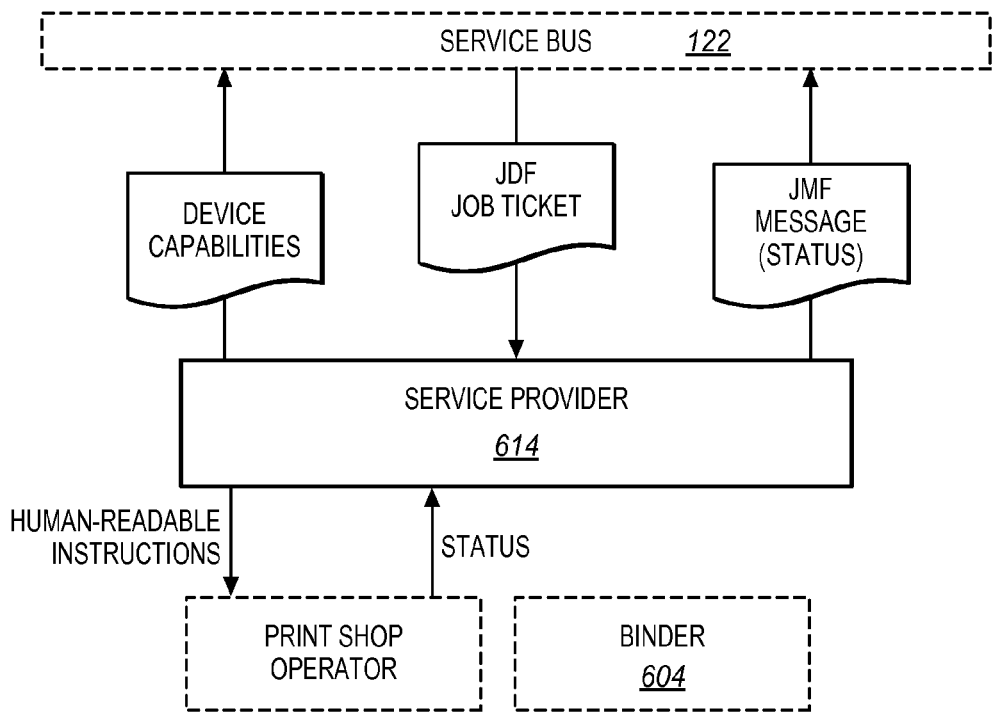
FIG. 8 illustrates messages exchanged between a service provider of a binder and a service bus in an exemplary embodiment of the invention.

FIG. 8 illustrates the messages exchanged between service provider 614 and service bus 122 in an exemplary embodiment of the invention. Service provider 614 receives the JDF job ticket from service bus 122. The JDF job ticket requests that service provider 614 execute a binding process on binder 604 to bind the printed pages for the instruction book. Because binder 604 is an offline device, service provider 614 is not able to provide device-specific operational commands to binder 604. Instead, service provider 614 generates human-readable instructions which instruct the print shop operator how to configure and operate binder 604. The print shop operator then follows the instructions from service provider 614 to operate binder 604.

Service provider 614 also monitors the status of the binding process on binder 604. Service provider 614 may rely on input from the print shop operator as the status of the binding process (e.g., completed or not completed). Service provider 614 then transmits a JMF message back to service bus 122 indicating the status so that service bus 122 may monitor the overall status of the print job. For example, service provider 614 may transmit a JMF message indicating when the binding process has been completed.

After the binding process has been completed, the output from binder 604 comprises bound, printed pages for the instruction book that have to be cut to the appropriate size. The next step in the workflow is to cut the bound, printed pages down to the desired size. Because cutter 607 is a near-line device, the output from binder 604 is not automatically sent to cutter 607 as input. Thus, service bus 122 instructs the print shop operator to manually insert the bound, printed pages in cutter 607. Service bus 122 also routes a JDF job ticket to service provider 617 (which is associated with cutter 607).

Figure 9:
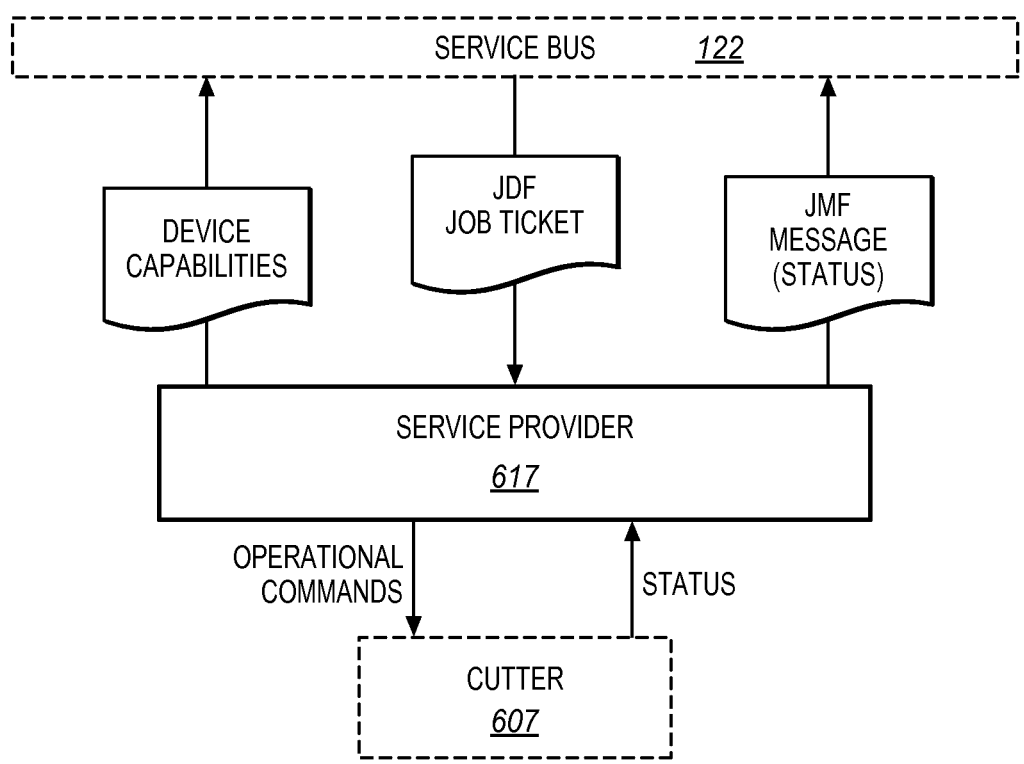
FIG. 9 illustrates messages exchanged between a service provider for a cutter and a service bus in an exemplary embodiment of the invention.

FIG. 9 illustrates the messages exchanged between service provider 617 and service bus 122 in an exemplary embodiment of the invention. Service provider 617 receives the JDF job ticket from service bus 122. The JDF job ticket requests that service provider 617 execute a cutting process on cutter 607 to cut the bound, printed pages for the instruction book. Thus, service provider 617 converts the JDF job ticket into device-specific operational commands in the format compatible with cutter 607, and transmits the device-specific operational commands to cutter 607. Cutter 607 then executes the operational commands to cut the bound, printed pages.

Service provider 617 also monitors the status of the cutting process on cutter 607. Service provider 617 transmits a JMF message back to service bus 122 indicating the status so that service bus 122 may monitor the overall status of the print job. For example, service provider 617 may transmit a JMF message indicating when the cutting process has been completed.

After the cutting process has been completed, the output from cutter 607 comprises a completed, bound instruction book. Service bus 122 may then execute the print job again to generate another copy of the instruction book as desired.

The print shop operator may manage or modify the job that is being executed in service bus 122. For instance, if black and white printer 602 encounters an error or becomes unavailable, then the print shop operator may modify the job ticket to utilize black and white printer 603 instead. Service bus 122 then stores the modified job ticket.

Print Job Scheduling

Figure 11:
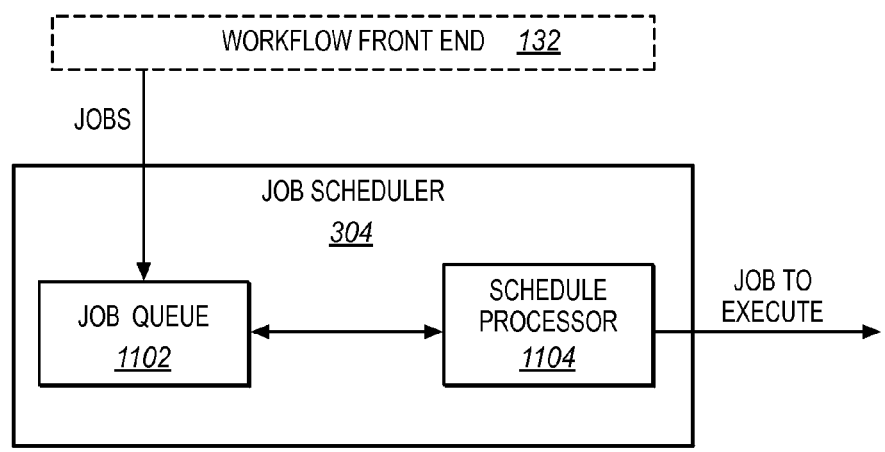
FIG. 11 illustrates a job scheduler in an exemplary embodiment of the invention.

Another embodiment of the invention comprises systems and methods of scheduling jobs for execution, such as in a print shop. FIG. 11 illustrates job scheduler 304 in an exemplary embodiment of the invention. Job scheduler 304 in this embodiment includes a job queue 1102 and a schedule processor 1104. Job queue 1102 comprises any system, software, or module operable to store one or more jobs for execution. Schedule processor 1104 comprises any system, software, or module operable to schedule the order of executing the jobs on the devices 101-104 (see FIG. 1). Although job scheduler 304 is illustrated as being implemented in service bus 122, those skilled in the art will appreciate that job scheduler 304 may be implemented in a workflow front end 132 or in another system.

FIG. 12 is a flow chart illustrating a method 1200 of scheduling jobs in an exemplary embodiment of the invention. The steps of method 1200 will be described with reference to job scheduler 304 in FIG. 3 although method 300 may be performed through other architectures and other devices in other embodiments. The steps of the flow chart in FIG. 12 are not all inclusive and may include other steps not shown.

In step 1202, job queue 1102 receives a plurality of jobs from workflow front end 132, and stores the jobs. The jobs may be defined in the form of JDF job tickets. To schedule the jobs that are stored in job queue 1102, schedule processor 1104 processes each of the stored jobs. In processing the jobs, schedule processor 1104 identifies the process(es) defined in each of the jobs by a print shop operator or another user. As previously described, each of the processes defined in a job may define one or more operating parameters for the device upon which the process will be performed. For example, if the device comprises a printer, then the operating parameters of a process may define the type of media used in the printing process, such as 8½×11 size, 90 brightness, 20 pound stock. For another example, the operating parameters may be the finisher configuration of the printer, such as to staple the output on the upper right corner.

In step 1206, schedule processor 1104 identifies the processes from the jobs that define one or more common (i.e., the same or equivalent) operating parameters on a device. For example, schedule processor 1104 identifies the processes that use the same type of media on a printer, use the same type of finisher configuration on a printer, use the same dimensions on a cutter, etc. Schedule processor 1104 then groups these processes together in a logical fashion so that the jobs having processes that define common operating parameters are grouped together.

Another way of describing step 1206 is that schedule processor 1104 identifies a common subset of device capabilities that are requested in the processes of the jobs. As previously mentioned, each process is a subset of the device capabilities of the devices, such as the devices shown in FIG. 1. Thus, each process describes or requests a subset of the overall device capabilities of the devices. Schedule processor 1104 may identify those processes in the jobs that request the same or a common subset of the device capabilities. For instance, if the device capabilities indicate that a printer has the capability of two-hole punching and processes in two or more jobs request that the output of the printer be two-hole punched, then schedule processor 1104 may identify that these processes request the same subset of two hole punching.

Schedule processor 1104 then schedules the jobs for execution based on the processes that define common operating parameters (or request a common subset of the device capabilities) in step 1208. Schedule processor 1104 may schedule the jobs for execution so that the jobs having the processes that define common operating parameters are executed sequentially on the device. For example, if two jobs have processes that call for the same type of paper stock on a printer, then schedule processor 1104 may schedule these two jobs sequentially so that the paper stock in the printer does not need to be changed for other intermediate jobs that call for a different type of paper stock.

There may be instances where processes in a job share one type of operating parameters with processes in one job, and also share another type of operating parameters with processes in another job. In these instances where there is a conflict between common operating parameters of different jobs, schedule processor 1104 may resolve the conflict in a variety of ways. In one embodiment, schedule processor 1104 may resolve the scheduling of the jobs based on a priority or importance of the common operating parameters. For instance, assume that job A and job B both include processes that call for a particular type of paper stock, and job A and job C both include processes that call for a particular type of finisher process. Schedule processor 1104 may schedule the jobs as A, B, and then C based on the common type of paper stock, or may schedule the jobs as A, C, and then B based on the common finisher configuration. To determine which schedule is more efficient, schedule processor 1104 may prioritize the common operating parameters. For instance, it may be more difficult to change the paper stock on a printer than to change the finisher configuration of the printer, so schedule processor 1104 may determine that the operating parameter that defines the type of paper stock has a higher priority than the operating parameter that defines the finisher configuration. In such a case, schedule processor 1104 would schedule the jobs as job A, B, and then C.

By looking at the operating parameters of the processes in the jobs, schedule processor 1104 can advantageously schedule the jobs in an intelligent manner. Instead of relying on the print shop operator or another user to manually and subjectively determine the schedule for executing the jobs, schedule processor 1104 can determine the optimal order for executing the jobs based on the based on the operating parameters for the processes. Thus, a print shop can operate more efficiently.

Also, by implementing the job scheduler 304 (see FIG. 3) in the service bus 122, there is centralized scheduling of jobs. Thus, if there are multiple front ends 132 (see FIG. 1) connected to the service bus 122, each workflow front end 132 can create jobs and send the jobs to service bus 122. Job scheduler 304 may then schedule the all of the jobs from the multiple workflow front ends 132. Scheduling of jobs from each of the workflow front ends 132 is centralized in service bus 122, which is an effective way of scheduling multiple jobs from multiple workflow front ends 132.

Example #2

Assume that job scheduler 304 receives four print jobs (print jobs A-D) from workflow front end 132 (see FIG. 6). Print job A defines two processes: one process for printing to printer 601, and another process for printing to printer 602 with an inline punching finisher. Print job B defines a process for printing to printer 602 with a saddle stitching finisher. Print job C defines a process for printing to printer 602 with an inline punching finisher. Print job D defines a process for printing to printer 602 with a saddle stitching finisher.

Job queue 1102 (see FIG. 11) stores print jobs A-D. To determine the schedule for executing the print jobs A-D, schedule processor 1104 identifies the process(es) defined in each of the print jobs A-D. Schedule processor 1104 also identifies the processes from the print jobs A-D that define one or more common operating parameters on a device. In this example, schedule processor 1104 identifies that print job A defines a process on printer 602 that calls for an inline punching finisher, and that print job C also defines a process on printer 602 that calls for the inline punching finisher. Similarly, schedule processor 1104 identifies that print job B defines a process on printer 602 that calls for an inline saddle stitching finisher, and that print job D also defines a process on printer 602 that calls for the inline saddle stitching finisher. Schedule processor 1104 then groups these processes having common operating attributes together in some logical fashion.

Schedule processor 1104 then schedules the print jobs A-D for execution based on the processes that define common operating parameters. In this example, print jobs A and C both define processes on printer 602 that call for the inline punching finisher. Thus, schedule processor 1104 schedules print job A first, then print job C so that they will be executed sequentially on printer 602. Print jobs B and D both define processes on printer 602 that call for the inline saddle stitching finisher. Thus, schedule processor 1104 schedules print job B next, then print job D so that they will be executed sequentially on printer 602. Based on the operating parameters for print jobs A-D, schedule processor 1104 determines that the following schedule is most efficient:
Print job A
Print job C
Print job B
Print job D Example #3

Assume for another example that job scheduler 304 receives four print jobs (print jobs A-D) again from workflow front end 132 (see FIG. 6). Print job A defines a process for printing to printer 602 with the following paper stock: 8½× 11, 20 lb, 92 GE brightness. Print job B defines a process for printing to printer 602 with the following paper stock: 8½× 11, 24 lb, 96 GE brightness. Print job C defines a process for printing to printer 602 with the following paper stock: 11×17, 24 lb, 96 GE brightness. Print job D defines a process for printing to printer 602 with the following paper stock: 8½× 11, 20 lb, 92 GE brightness.

Job queue 1102 (see FIG. 11) stores print jobs A-D. In order to determine the schedule for executing the print jobs A-D, schedule processor 1104 identifies the process(es) defined in each of the print jobs A-D. Schedule processor 1104 also identifies the processes from the print jobs A-D that define one or more common operating parameters on a device. In this example, schedule processor 1104 identifies that both print jobs A and D define a process on printer 602 that calls for 8½×11 paper, 20 lb, 92 GE brightness. Schedule processor 1104 then groups these processes having common operating attributes together in some logical fashion.

Schedule processor 1104 then schedules the print jobs A-D for execution based on the processes that define common operating parameters. In this example, print jobs A and D both define a process on printer 602 that calls for 8½×11 paper, 20 lb, 92 GE brightness. Thus, schedule processor 1104 schedules print job A first, then print job D so that they will be executed sequentially on printer 602. Print jobs B and C don't share a common paper stock, but may share other operating parameters. Based on the operating parameters for print jobs A-D, schedule processor 1104 determines that the following schedule is most efficient:
Print job A
Print job D
Print job B
Print job C

CONCLUSION

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 13 is a block diagram depicting a computer system 1300 adapted to provide features and aspects hereof by executing programmed instructions and accessing data stored on a computer readable storage medium 1312.

Furthermore, embodiments of the invention can take the form of a computer program product accessible from a computer-usable or computer-readable medium 1312 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 1300 suitable for storing and/or executing program code will include at least one processor 1302 coupled directly or indirectly to memory elements 1304 through a system bus 1350. The memory elements 1304 can include local memory employed during actual execution of the program code, bulk storage, and cache memories which provide temporary storage of at least some program code in order to reduce the number of times code must be retrieved from bulk storage during execution.

Input/output or I/O devices 1306 (including but not limited to keyboards, displays, pointing devices, etc) can be coupled to the system either directly or through intervening I/O controllers. Network adapter interfaces 1308 may also be coupled to the system to enable the computer system 1300 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1310 may be coupled to the system to interface to one or more presentation device such as printing systems and displays for presentation of presentation data generated by processor 1302.

Although specific embodiments were described herein, the scope of the invention is not limited to those specific embodiments. The scope of the invention is defined by the following claims and any equivalents thereof.

I claim:

1. A job scheduler system, comprising:
   a workflow front end operable to determine device capabilities for devices of a print shop, and further operable to generate job tickets for a plurality of print jobs of the print shop based on the determined device capabilities;
   a job queue operable to store the plurality of jobs, where each of the jobs has a job ticket that includes at least one process that defines operating parameters for devices requested to handle the job; and
   a schedule processor operable to compare the processes from the jobs to identify processes of different jobs that define at least one common operating parameter for the devices requested to handle the job, and to schedule the plurality of jobs for processing at the print shop such that jobs having processes that define the at least one common operating parameter are executed sequentially on one or more of the devices of the print shop.

2. The job scheduler system of claim 1 wherein:
   the schedule processor is further operable to identify a shared operating parameter for a specific device, and to schedule jobs with the shared operating parameter to execute sequentially on the specific device.

3. The job scheduler system of claim 1 wherein:
   the schedule processor is further operable to identify the processes from the jobs that define a common media for the device, and to schedule the jobs for execution based on the processes that define the common media for the device.

4. The job scheduler system of claim 3 wherein the common media comprises a paper stock of a particular size, brightness, and weight.

5. The job scheduler system of claim 1 wherein:
   the schedule processor is further operable to identify the processes from the jobs that define a common configuration for the device, and to schedule the jobs for execution based on the processes that define the common configuration for the device.

6. The job scheduler system of claim 5 wherein:
   the device comprises a printer; and
   the common configuration for the printer comprises a common finisher configuration for the printer.

7. A method for scheduling jobs, the method comprising:
   determining device capabilities for devices of a print shop;
   generating job tickets for a plurality of print jobs of the print shop based on the determined device capabilities, where each of the jobs has a job ticket that includes at least one process that defines operating parameters for devices requested to handle the job;
   comparing the processes from the jobs to identify processes of different jobs that define at least one common operating parameter for the devices requested to handle the job; and
   scheduling the plurality of jobs for processing at the print shop such that jobs having processes that define the at least one common operating parameter are executed sequentially on one or more of the devices of the print shop.

8. The method of claim 7 wherein scheduling the jobs comprises:
   identifying a shared operating parameter for a specific device; and
   scheduling jobs with the shared operating parameter to execute sequentially on the specific device.

9. The method of claim 7 wherein:
   identifying the processes from the jobs that define at least one common operating parameter for the device comprises identifying the processes from the jobs that define a common media for the device; and
   scheduling the jobs comprises scheduling the jobs for execution based on the processes that define the common media for the device.

10. The method of claim 9 wherein the common media comprises a paper stock of a particular size, brightness, and weight.

11. The method of claim 7 wherein:
    identifying the processes from the jobs that define at least one common operating parameter for the device comprises identifying the processes from the jobs that define a common configuration for the device; and
    scheduling the jobs comprises scheduling the jobs for execution based on the processes that define the common configuration for the device.

12. The method of claim 11 wherein:
    the device comprises a printer; and
    the common configuration for the printer comprises a common finisher configuration for the printer.

13. A non-transitory computer readable medium tangibly embodying programmed instructions which, when executed by a computer system, are operable to perform a method for scheduling jobs, the method comprising:
    determining device capabilities for devices of a print shop;
    generating job tickets for a plurality of print jobs of the print shop based on the determined device capabilities, where each of the jobs has a job ticket that includes at least one process that defines operating parameters for devices requested to handle the job;
    comparing the processes from the jobs to identify processes of different jobs that define at least one common operating parameter for the devices requested to handle the job; and
    scheduling the plurality of jobs for processing at the print shop such that jobs having processes that define the at least one common operating parameter are executed sequentially on one or more of the devices of the print shop.

14. The computer readable medium of claim 13 wherein scheduling the job further comprises:

identifying a shared operating parameter for a specific device; and scheduling jobs with the shared operating parameter to execute sequentially on the specific device.

15. The computer readable medium of claim 13 wherein:

the device comprises a printer; and the at least one common operating parameter comprises a common finisher configuration for the printer.

16. A workflow architecture system implemented via a hardware processor, comprising:

service providers that are associated with devices of a print shop;

a service bus; and a workflow front end;

the service providers operable to report device capabilities of their associated device to the service bus;

the service bus operable to receive the device capabilities from the service providers, and to provide the device capabilities for the devices to the workflow front end;

the workflow front end operable to receive the device capabilities from the service bus, and to provide the device capabilities to a user to allow the user to define a plurality of jobs based on the device capabilities, wherein a job ticket of each print job defines at least one process that requests a subset of the device capabilities; and a job scheduler operable to receive the jobs from the workflow front end, to identify the at least one process in each of the jobs defined at the job ticket, to compare the processes of the jobs to identify processes of different jobs that request a common subset of the device capabilities, and to schedule the plurality of jobs for processing at the print shop such that jobs having processes that request a common subset of the device capabilities are executed sequentially on one or more of the devices.

17. The workflow architecture system of claim 16 wherein:

the jobs are defined in Job Definition Format (JDF) job tickets; and the job scheduler is operable to process the JDF job tickets to identify the processes from the jobs that request a common subset of the device capabilities.

18. A method for scheduling jobs in a workflow architecture where a job editor receives device capabilities of the devices operable to handle print jobs, and generates a plurality of jobs based on the device capabilities of the devices, the method comprising:

receiving the jobs, where each of the jobs has a job ticket that defines at least one process that requests a subset of the device capabilities;

identifying the at least one process in each of the jobs;

comparing the processes from the jobs to identify processes of different jobs that request a common subset of the device capabilities; and scheduling the plurality of jobs for processing at multiple devices of the print shop such that jobs having processes that request a common subset of the device capabilities are executed sequentially on one or more of the devices.

19. The method of claim 18 wherein:

the jobs are defined in Job Definition Format (JDF) job tickets; and the method further comprises processing the JDF job tickets to identify the processes from the jobs that request one or more common device capabilities.

* * * * *